(12) United States Patent
Matic et al.

(10) Patent No.: US 7,908,623 B2
(45) Date of Patent: Mar. 15, 2011

(54) SET TOP BOX FOR PC/HDTV MULTIMEDIA CENTER

(75) Inventors: Branislav Matic, Dorval (CA); Goran Matic, Pointe-Claire (CA)

(73) Assignee: MATROX Electronic Systems Ltd., Dorval, Quebec (CA)

( * ) Notice: Subject to any disclaimer, the term of this patent is extended or adjusted under 35 U.S.C. 154(b) by 1733 days.

(21) Appl. No.: 10/898,682

(22) Filed: Jul. 26, 2004

(65) Prior Publication Data
US 2005/0273824 A1    Dec. 8, 2005

Related U.S. Application Data

(60) Provisional application No. 60/570,076, filed on May 12, 2004.

(51) Int. Cl.
- H04N 7/18 (2006.01)
- H04N 7/173 (2006.01)
- H04N 7/16 (2006.01)

(52) U.S. Cl. ............ 725/80; 725/86; 725/100; 725/131; 725/151; 725/139

(58) Field of Classification Search ............... 725/80, 725/86, 100, 131, 151, 139
See application file for complete search history.

(56) References Cited

U.S. PATENT DOCUMENTS

| | | | |
|---|---|---|---|
| 5,313,592 A | 5/1994 | Buondonno et al. | |
| 5,434,913 A * | 7/1995 | Tung et al. | 379/202.01 |
| 5,781,747 A | 7/1998 | Romascan et al. | |
| 5,805,806 A | 9/1998 | McArthur | |
| 5,936,660 A | 8/1999 | Gurantz | |
| 5,982,363 A | 11/1999 | Naiff | |
| 6,003,105 A | 12/1999 | Vicard | |
| 6,088,752 A | 7/2000 | Ahern | |
| 6,185,643 B1 | 2/2001 | Kirshtein et al. | |
| 6,195,797 B1 * | 2/2001 | Williams, Jr. | 725/74 |
| 6,243,743 B1 | 6/2001 | Freeny | |
| 6,333,750 B1 | 12/2001 | Odryna et al. | |
| 6,418,494 B1 | 7/2002 | Shatas et al. | |
| 6,418,504 B2 | 7/2002 | Conway et al. | |
| 6,578,101 B1 * | 6/2003 | Ahern | 710/306 |
| 6,594,719 B1 | 7/2003 | Ahern et al. | |
| 6,735,658 B1 | 5/2004 | Thornton | |
| 6,898,651 B2 * | 5/2005 | Wang et al. | 710/266 |
| 7,301,900 B1 * | 11/2007 | Laksono | 370/230 |

(Continued)

FOREIGN PATENT DOCUMENTS

| WO | WO 01/82089 A2 * | 4/2000 |
|---|---|---|
| WO | WO 0182089 A2 * | 11/2001 |
| WO | WO 0182089 A2 | 11/2002 |

*Primary Examiner* — Christopher Kelley
*Assistant Examiner* — Franklin S Andramuno
(74) *Attorney, Agent, or Firm* — Anglehart et al.

(57) ABSTRACT

A multimedia system is provided, comprising a computer for receiving audio data and video data from a source and transmitting the data serially over a high speed serial link, a set-top box connected through the link to the computer for receiving the audio data and video data, the set-top box having a southbridge module with a link interface connected to the link and providing a local parallel data bus output and at least one audio playback channel receiving the audio data; and a graphics processor receiving from the southbridge module the video data over the bus, processing the video data and providing a video output in at least one display format. At least one display device is connected to the graphics processor for receiving and displaying the video output; and at least one speaker is connected to the audio playback channel.

16 Claims, 4 Drawing Sheets

U.S. PATENT DOCUMENTS

| | | | |
|---|---|---|---|
| 2003/0030653 A1* | 2/2003 | Swan | 345/660 |
| 2004/0083325 A1 | 4/2004 | Rabinovitz et al. | |
| 2004/0261112 A1* | 12/2004 | Hicks et al. | 725/89 |
| 2005/0135490 A1* | 6/2005 | Zimler et al. | 375/257 |
| 2005/0160471 A1* | 7/2005 | Cohen | 725/116 |
| 2007/0220279 A1* | 9/2007 | Northcutt et al. | 713/193 |

* cited by examiner

SET TOP BOX FOR PC/HDTV MULTIMEDIA CENTER

CROSS-REFERENCE TO RELATED APPLICATIONS

The application claims priority of US provisional patent application Ser. No. 60/570,076 filed on May 12, 2004, the contents of which are hereby incorporated by reference.

FIELD OF THE INVENTION

The invention relates to the field of multimedia centers. More specifically, it relates to a system for providing audio and video data from a computer system to a remote display device.

BACKGROUND OF THE INVENTION

Convergence of Standard and/or High Definition TV (SDTV and HDTV) and personal computer (PC) systems is the new promising category of products for emerging multimedia markets.

In current systems, PC graphics video is generated by PC video subsystems which convert CPU generated commands or digital video data in images on PC monitors. HDTV video is generated from the signal received from video source (satellite, over the air, cable, DVD, Hard Disk, Internet, etc.) by a HDTV video subsystem to generate images on TV screens.

Both HDTV and PC video subsystems have very similar architecture, consisting of a video chip and video memory. While the HDTV and PC video chip each support particular features, they are very similar in overall function.

Currently, HDTV video subsystems comprise a unit known as a Set Top Box (STB) unit which typically contains a microprocessor, memory, MPEG decoding chip, audio decoding and processing components and optionally hard disk, LAN interface, extensive I/O etc. Full-function STB can also run an operating system (usually Linux™ or Windows CE™), and specialized software applications. Such full-function STB devices tend to be complex and expensive specialized HDTV computers, which unfortunately lack the full performance and functionality of regular PC. The trend in the industry is towards using the capabilities of regular PCs for HDTV video subsystems. Indeed, PCs are becoming more and more pervasive in households and are sufficiently powerful to perform many audio and video processing of the level required by an HDTV subsystem.

Prior art PC/HDTV systems do not connect PC video subsystems directly to the set-top box or connect the PC video subsystem to the set-top box subsystem through display cables, such as DVI, which are expensive and unsuitable for use over long distances or for feeding multiple displays. Such display cables used in prior art systems are needed since the video signal is processed and prepared for display on the PC side, where the graphics processing unit (GPU) lies. There exists therefore a need for a PC/HDTV system which would provide the advantages of a remotely located PC without the disadvantages due to directly transporting PC video signals over long distances to the point of display.

Additionally, full-function stand-alone STB units combining HDTV and PC functionality require built-in PC equivalent software and hardware at each remote point of HDTV/PC display which increases significantly the cost of such systems, especially with multiple STB units.

SUMMARY OF THE INVENTION

Accordingly, an object of the present invention is to provide a multimedia system integrating a PC and a remotely located HDTV display.

According to a first broad aspect of the present invention, there is provided a multimedia client/server system comprising: a computer server for receiving audio data and video data from a source and transmitting the data serially over a high speed serial link; a set-top box thin split client connected through the link to the computer for receiving the audio data and video data, the set-top box having: a southbridge I/O module with a link interface connected to the link and providing a local parallel data bus output and at least one audio playback channel receiving the audio data; and a graphics processor receiving from the southbridge module the video data over the bus, processing the video data and providing a video output in at least one display format; at least one display device connected to the graphics processor for receiving and displaying the video output; and at least one speaker connected to the audio playback channel.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

The multimedia system of the present invention converges processing of HDTV and PC data in a single solution with superior performance and lower cost than stand-alone STB solutions or solutions in a single PC chassis.

A multimedia center, such as the one described in the present invention, provides full HDTV capability together with full PC capability on a remote client HDTV set, analog TV set or high resolution PC monitor, without any PC hardware or software installed inside the set-top box remote client. The system would provide access to all functionalities of a sophisticated PC-based multimedia system with an HDTV set, as well as all regular PC functions and applications and multimedia applications at each point of display. Such applications include Internet browsing, gaming, digital photography, digital music, digital video, DVD and PVR player/recorder, office applications, etc. The system also provides digital TV set-top functionality including access to a wide range of content from Multichannel Video Program Distributors (MPVDs) such as digital cable or DBS satellite. This content includes standard and high definition television programming from both standard as well as premium networks, digital music channels, impulse pay per view (IPPV), video on demand (VOD), Subscription Video on Demand (SVOD), etc. Other digital set-top box features are supported including programmable video recorder (PVR) and DVD player/recorder. The system permits both PC and digital set-top content and media to be shared with other compliant devices over a network.

Figure 1:
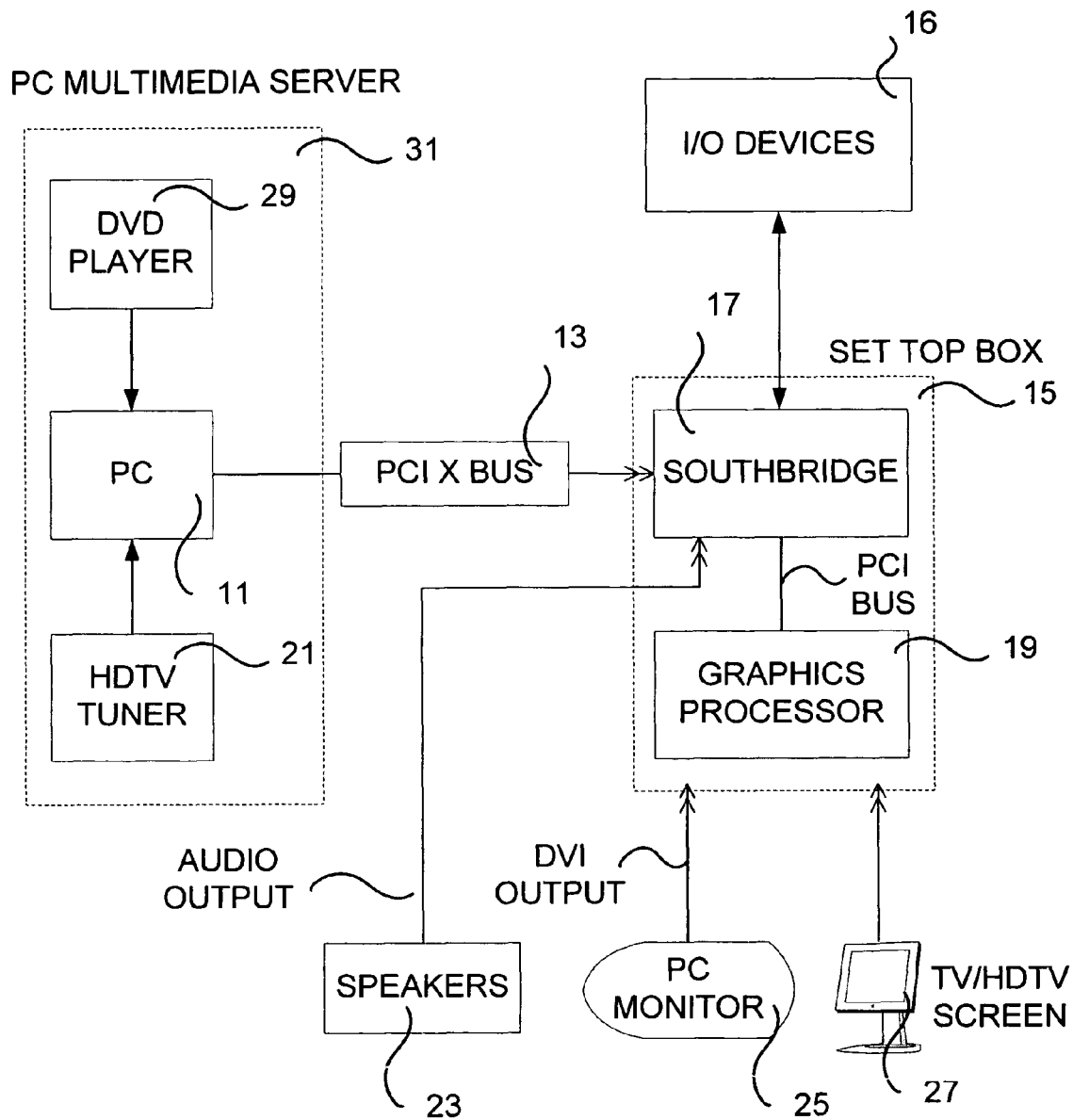
FIG. 1 is a block diagram of a PC with HDTV tuner connected through a serial high speed X-bus link to a HDTV set and a PC monitor, according to a preferred embodiment of the present invention.

Referring now to the drawings and more particularly to FIG. 1, shown therein and designated by the reference numeral 15, is a preferred embodiment of a split set top box (STB) constructed in accordance with the present invention. A PC system 11 is provided having components well-known to those skilled in the art. In the preferred embodiment of the present invention, the PC system includes, for example, a central processing unit (CPU), random access memory (RAM), read-only memory (ROM), as well as various peripheral devices, each connected to a local bus system. Also coupled to the local bus system are a mass storage device, a keyboard, a pointing device (mouse, trackball, touchpad, etc.), a communication device, etc. The communication device is any device allowing the PC system 11 to communicate with a remotely located PC over a communication link, such as a telephone modem, cable modem, ISDN, etc.

In one embodiment of the present invention, the PC system 11 is connected to a High Definition Television (HDTV) tuner 21 from which it receives broadcast digital television data, including video and audio data. The audio/video data is received as an MPEG-2 encoded audio/video stream. Following the HDTV tuner 21 receiving the encoded stream, a descrambler module proceeds to decrypt it according to methods well-known in the art. The received video stream can be stored on a hard disk for later replay on demand or transmitted directly to the STB unit 15. Furthermore, an MPEG CODEC in either PC system 11 or STB unit 15 will also de-compress the received stream, so that it may be processed and formatted for display.

In a different embodiment, the PC system 11 is connected to a DVD player 29, which would provide a DVD audio/video stream. The DVD audio/video stream would be MPEG-2 encoded as well and it would be read and decompressed by an MPEG CODEC module in either the PC system or the STB unit 15.

The local bus of the PC system 11 is connected to an expansion bus, such as the PCI Express serial bus 13. The PCI Express bus 13 is a high speed serial link allowing for low-overhead, low-latency communication between the components connected to it. The PCI Express high speed serial connection between the PC system 11 and the STB unit 15 can be an electrical connection or an optical connection. For example, twisted pair Ethernet cable of the CAT6 type can be used for a cost-effective solution, providing signal up to a length of 10 feet, or, using MAXIM equalizers to compensate for cable loss, STB units in a range of 40 feet could be serviced. Alternatively, optical fiber cables could be used for much larger distances, such as in industrial/commercial applications.

The stream received by the PC system 11 is selectively transmitted through the PCI X bus 13 to the STB unit 15. According to the preferred embodiment of the present invention and as illustrated in FIG. 1, STB unit 15 contains a southbridge module which receives data sent serially over the PCI Express bus 13 and provides a link to the STB local PCI bus.

On the local PCI bus, video data is transferred to a graphics processor 19, that processes data in a plurality of formats. for a plurality of displays. In the preferred embodiment of the present invention, the graphics processor 19 is a Matrox graphics chip(Sundog), while the southbridge 17 is preferably a ULi M1573 chip.

The graphics processor 19 can produce several PC graphics video outputs, such as a DVI output or an RGB output, which is sent to a PC monitor 25 or TV video outputs, such as Standard Definition (SD) output or High Definition (HD) output, to be displayed on a TV/HDTV display 27.

Figure 4:
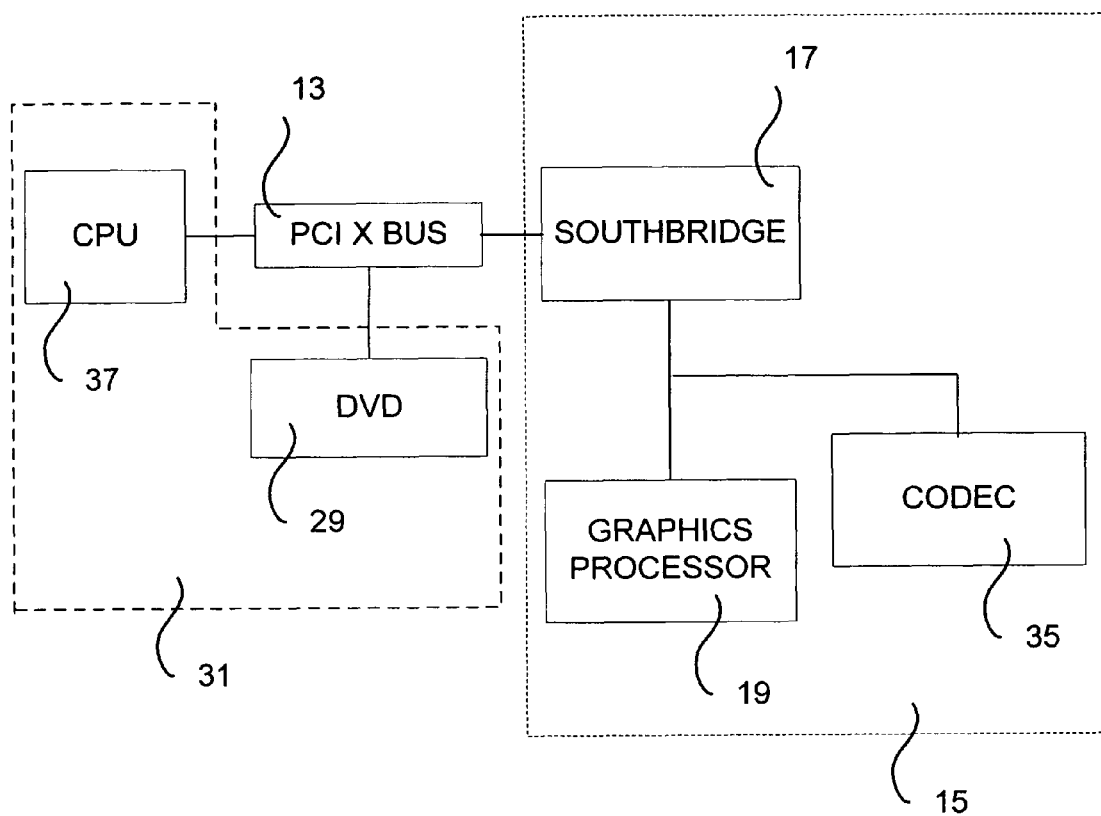
FIG. 4 is a block diagram of a PC with DVD player connected to an HDTV set including a CODEC, according to an embodiment of the present invention.

While in the preferred embodiment of the present invention, the southbridge module 17 and the graphics processor 19 are distinct units communicating through a local PCI bus, it can be appreciated that in alternative embodiments, the southbridge module 17 and the graphics processor 19 could be provided as a single unit or chip (such as Matrox SX-90/MX), which may include a built-in MPEG decoder. Such an embodiment is shown in FIG. 4, in which the server 31 comprises a CPU unit 37 and a DVD reader connected through the PCI X bus 13 to the STB unit 15. The DVD reader 29 provides an MPEG-encoded video/audio stream to the STB unit 15, where it is directed to the CODEC module 35 for decoding. Such a configuration allows for better utilization of the PCI X bus 13 bandwidth, allowing a plurality of STB units 15 to receive audio and video data from a same server 31.

At least one speaker 23 is connected to the southbridge module 17 and receives audio data from an audio playback channel. Smaller speakers 23 can be connected directly to an audio chip power amplifier installed in the STB unit 15, while for larger speakers an internal or external amplifier would be used.

Figure 3:
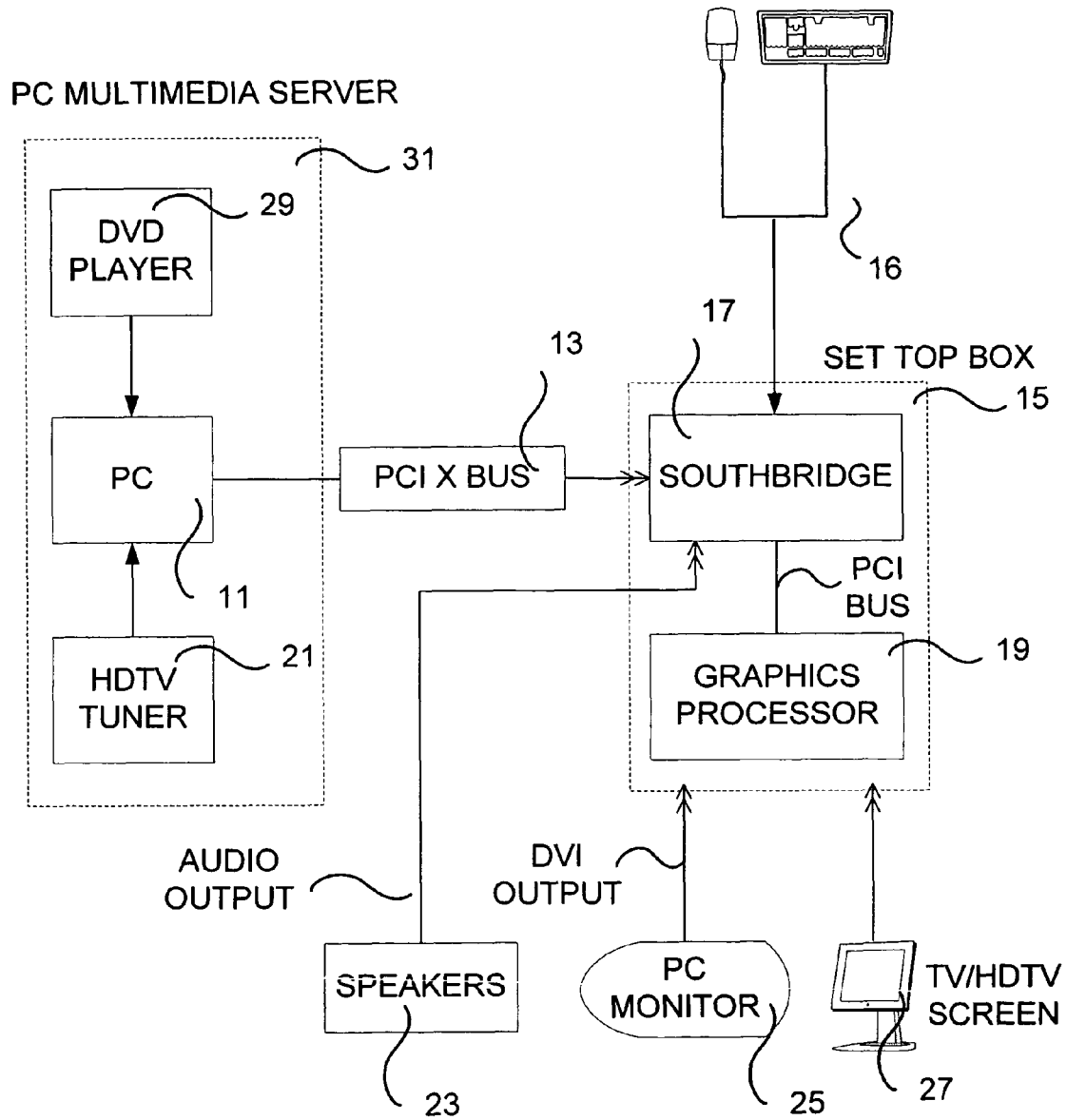
FIG. 3 is a block diagram of a PC with HDTV tuner connected through a serial high speed X-bus link to a HDTV set receiving input from a mouse and a keyboard, according to an embodiment of the present invention.

In the preferred embodiment of the present invention, a user can interact with the multimedia system through a remote control. The remote control commands are first sent to the south bridge 17 of the set-top box unit 15, which may include an infrared (IF), radio frequency (RF) or USB receiver. As shown in FIG. 3, the STB unit 15 preferably includes means for interfacing with additional I/O devices 16, such as a standard PC keyboard, a mouse, game controller inputs and other USB-compatible I/O devices.

From the STB unit 15, the commands are then redirected through the PCI Express bus 13 to the PC system 11. These commands are interpreted by the PC system 11 as coming from any other PC inputs device, such as the standard PC keyboard, mouse, PC Media Center remote control, or game controller inputs.

PC applications can send commands to the set-top subsystem. For example a PC application can trigger changing channels or entering a programming event into the PVR event-recording list.

Remote commands are first processed by the STB unit 15, and then sent to the PC system 11. If a PC application requires executing actions controlled by the STB unit 15, the required commands are then sent back to the STB unit 15.

In one embodiment of the present invention, there are provided I/O devices such as a keyboard and a mouse at the STB unit 15, providing to a viewer full HDTV capability together with full PC capability and functionalities of a sophisticated PC-based multimedia system without any PC hardware or software installed inside said set-top box. The keyboard/mouse commands will be received at the PC system 11 as if they were originating from the local PC system keyboard/mouse. Operating systems such as Linux™ or Windows NT™ provide support for multiple keyboard/mouse input.

Figure 2:
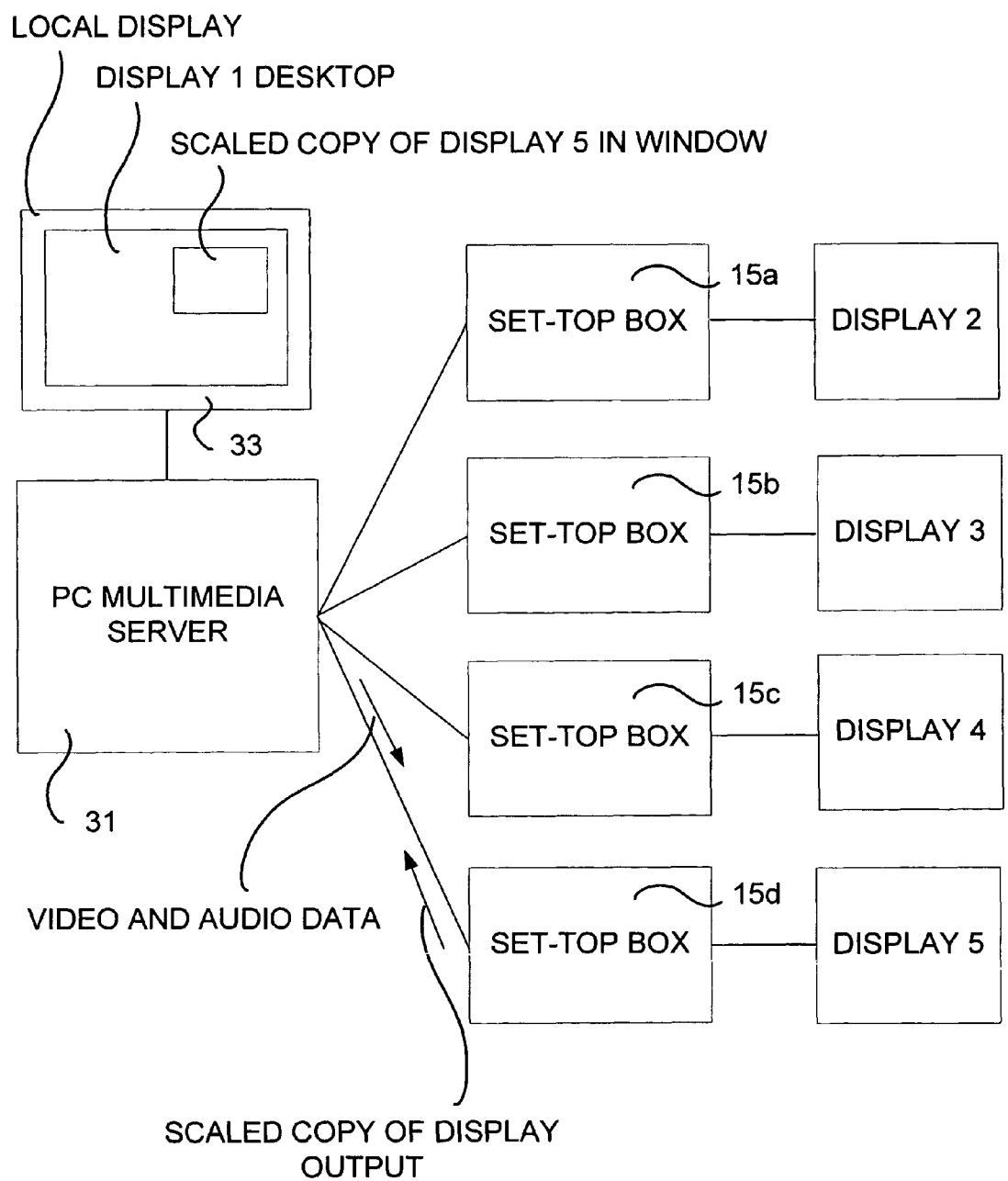
FIG. 2 is a block diagram of a PC multimedia server connected to a plurality of set-top box clients, according to an embodiment of the present invention.

Referring to FIG. 2, a network of Split STBs connected to a single PC in a client/server configuration is illustrated. Each STB unit 15 has its own high speed serial connection to the PC multimedia server 31. In home entertainment applications with multiple STBs this solution offers significantly lower cost per STB unit 15 since a PC multimedia server 31 software, hardware and contents are shared between many STB units 15.

As shown in FIG. 2, in one embodiment of the present invention, a local display 33 is connected to the PC server 31, providing the possibility that a remote screen display buffer of the STB unit 15 be scaled and presented in a window on the local PC display. This feature would be advantageous in the case in which the STB displays are remote and cannot be viewed from the PC server 31. The feature is enabled by the fact that the PC system 11 can read/write any portion of the STB unit 15 remote video memory and copy it to the local PC video buffer for local display. In fact, the STB unit 15 remote video memory appears to the PC system 11 as any other local video card. Similarly, the content of the local PC system 11 video buffer can be sent for display to any remote STB unit 15. In the case in which a plurality of STB units 15 are connected in a network, the contents of any STB screen display buffer can be sent for display to any other STB screen display buffer.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A multimedia system, comprising:
   a computer for receiving audio data and video data from a source and transmitting said data serially over a high speed serial link;
   a set-top box remote from said computer, said set-top box connected via said link to said computer, said set-top box including:
      a southbridge module with a link interface connected to said high speed serial link over which said southbridge module receives said audio data and video data from said computer, said southbridge module having at least one audio playback channel for receiving said audio data; and
      a graphics processor connected to said southbridge module, said graphics processor receiving said video data from said southbridge module, processing said video data and providing a video output in at least one display format;
   at least one display device connected to said graphics processor of said set-top box for receiving and displaying said video output; and
   at least one speaker connected to said audio playback channel of said southbridge module, said at least one speaker receiving said audio data directly from said southbridge module via said audio playback channel;
   said computer and said set-top box together being operative to provide to a viewer of said multimedia system full high definition television capability and full personal computer capability on said at least one display device without installation in said set-top box of any hardware or software of said computer.

2. A multimedia system as claimed in claim 1, wherein said high speed serial link is a PCI Express link.

3. A multimedia system as claimed in claim 1, wherein said source is an HDTV broadcast signal, and wherein said computer further comprises an HDTV tuner for receiving said signal.

4. A multimedia system as claimed in claim 1, wherein said source is an MPEG-encoded stream and wherein said system further comprises an MPEG decoder for decoding said stream.

5. A multimedia system as claimed in claim 4, wherein said MPEG-encoded stream is transmitted over said high speed serial link from said computer to said set-top box and wherein said MPEG decoder is part of said set-top box.

6. A multimedia system as claimed in claim 1, wherein said display format is TV format and wherein said at least one display device is a TV screen.

7. A multimedia system as claimed in claim 1, wherein said display format is DVI format.

8. A multimedia system as claimed in claim 1, wherein said high speed serial link is a twisted pair cable.

9. A multimedia system as claimed in claim 1, wherein said high speed serial link is an optical cable.

10. A multimedia system as claimed in claim 1, further comprising at least one I/O device connected to said southbridge module of said set-top box for sending commands to said computer from said set-top box.

11. A multimedia system as claimed in claim 10 wherein said I/O device is a remote control.

12. A multimedia system as claimed in claim 1, wherein
   said graphics processor is configured to scale said video output and to place a scaled copy in a graphics memory of said graphics processor; and
   said computer is configured to read said scaled copy via said serial link and said southbridge module, said computer operative to present said copy in a window of a local display of said computer.

13. A multimedia system, comprising:
   a computer for receiving audio data and video data from a source and transmitting said data serially over a high speed serial link;
   a set-top box remote from said computer, said set-top box connected through said link to said computer for receiving said audio data and video data, said set-top box having:
      a southbridge module with a link interface connected to said link and providing a local parallel data bus output and at least one audio playback channel receiving said audio data; and
      a graphics processor receiving from said southbridge module said video data over said bus, processing said video data and providing a video output in at least one display format;
   at least one display device connected to said graphics processor for receiving and displaying said video output;
   at least one speaker connected to said audio playback channel of said southbridge module, said at least one speaker receiving said audio data directly from said southbridge module via said audio playback channel; and
   at least one I/O device connected directly to said southbridge module for sending commands to said computer from said set-top box, said at least one I/O device including a keyboard and a mouse, whereby said display device provides to a viewer full HDTV capability together with full PC capability and functionalities of a sophisticated PC-based multimedia system without any PC hardware or software installed inside said set-top box.

14. A multimedia system as claimed in claim 3, wherein said computer is a multimedia server and includes a plurality of HDTV tuners, said system comprising a plurality of said set top boxes acting as clients, said plurality of set-top box clients receiving said audio data and video data from said HDTV tuners.

15. A multimedia system as claimed in claim 1, wherein said set-top box includes a local parallel data bus interconnecting said southbridge module and said graphics processor, said graphics processor receiving said video data from said southbridge module over said local parallel data bus.

16. A multimedia system as claimed in claim 10, wherein said at least one I/O device includes a keyboard and a mouse.

\* \* \* \* \*